Figure 1:
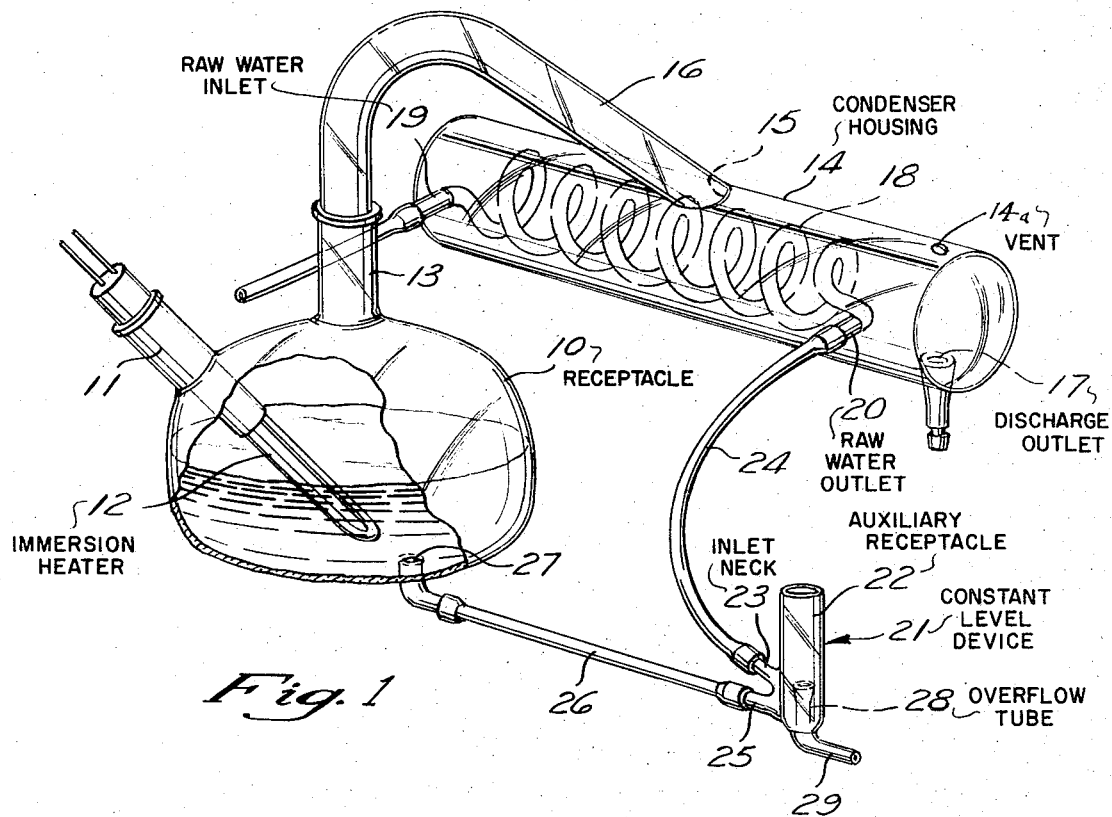

United States Patent [19]
Ruckstuhl

[11] 3,849,260
[45] Nov. 19, 1974

[54] WATER DISTILLATION APPARATUS
[75] Inventor: Raymond Charles Ruckstuhl, Delray Beach, Fla.
[73] Assignee: Oral Corporation, Boca Raton, Fla.
[22] Filed: June 14, 1973
[21] Appl. No.: 369,905

[52] U.S. Cl.............. 202/181, 137/389, 137/391, 23/292
[51] Int. Cl............................................. B01d 3/42
[58] Field of Search.......... 202/181, 193, 196, 180; 203/1, 7, DIG. 7; 222/264; 137/593, 389, 391, 395, 396

[56] References Cited
UNITED STATES PATENTS

| | | | |
|---|---|---|---|
| 1,635,112 | 7/1927 | Carlson et al........................ | 202/196 |
| 1,931,838 | 10/1933 | Beraud................................. | 202/180 |
| 2,254,538 | 9/1941 | Newman............................... | 202/193 |
| 2,475,482 | 7/1949 | Clemens............................... | 202/196 |
| 2,705,218 | 3/1955 | Canicoba.............................. | 202/181 |
| 3,330,740 | 7/1967 | Duffy................................... | 202/181 |

FOREIGN PATENTS OR APPLICATIONS

| | | | |
|---|---|---|---|
| 14,863 | 8/1928 | Australia............................... | 202/181 |

Primary Examiner—Norman Yudkoff
Assistant Examiner—D. H. Sanders
Attorney, Agent, or Firm—Oltman & Flynn

[57] ABSTRACT

A water distillation apparatus having a boiling chamber which receives water at the bottom from a constant level device having an overflow tube. A drain opening in the overflow tube automatically drains the boiling chamber after each use. A condenser, connected to receive water vapor from the boiling chamber, has a spiral tube inside which passes the water that is to be distilled into the inlet of the constant level device, and the water in this tube produces a cooling effect on the water vapor output from the boiling chamber.

6 Claims, 2 Drawing Figures

WATER DISTILLATION APPARATUS

BACKGROUND OF THE INVENTION

Various types of water distillation apparatus have been proposed heretofore, but none has been particularly well suited for use in the home, where frequent maintenance would be a bothersome, and probably neglected, chore. Typically, such prior apparatus have lacked a reliable and simple arrangement for draining the boiling chamber automatically often enough to avoid the buildup of deposits which over a period of time may seriously interfere with the operation of the apparatus and adversely affect the quality of distilled water that it is supposed to produce.

SUMMARY OF THE INVENTION

The present invention is directed to a novel and improved water distillation apparatus which is well suited for home use, requiring a minimum of maintenance, primarily because of its novel and simplified arrangement for automatically draining the boiling chamber after each use.

Accordingly, it is a principal object of this invention to provide a novel and improved water distillation apparatus.

Another object of this invention is to provide such an apparatus having a novel, simplified and reliable arrangement for automatically draining the boiling chamber each time the boiling is stopped and the inlet water is turned off.

Another object of this invention is to provide an improved water distillation apparatus having a novel arrangement for automatically draining the boiling chamber after each use which is embodied in a constant level device that controls the static water level in the boiling chamber.

Figure 2:
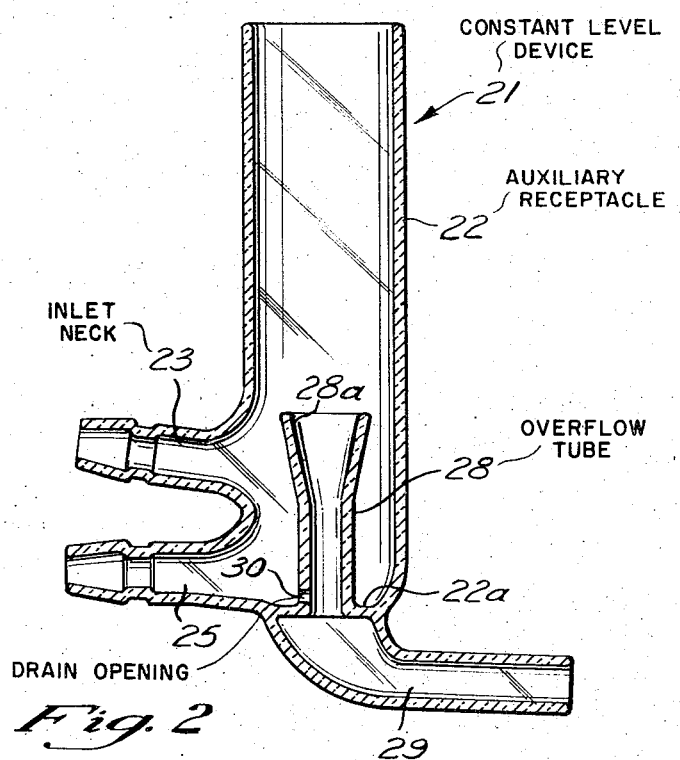

Further objects and advantages of this invention will be apparent from the following detailed description of a presentlypreferred embodiment thereof, which is shown in the accompanying drawing in which:

FIG. 1 is a perspective view of the present water distillation apparatus, but without the various conventional controls for turning it on and off; and FIG. 2 is an enlarged vertical section of the constant level device in the FIG. 1 apparatus.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

Referring to FIG. 1, the preferred embodiment of the present apparatus has a receptacle 10 of glass or other suitable material which defines a water boiling chamber. This receptacle is supported by a stand (not shown) of any suitable design. An upwardly and outwardly inclined, cylindrical neck 11 at one side of this receptacle near the top snugly receives an electrically energized immersion heater 12 which extends down into the water in the receptacle 10 to heat it to a boil. The receptacle 10 has a similar vertical neck 13 at the top which provides a vapor outlet for the steam produced by the boiling of the liquid water in the boiling chamber.

A horizontally disposed, generally cylindrical condenser housing 14 has a central inlet opening 15 that is connected through a bent tube 16 to the vapor outlet 13 from the boiling chamber. The condenser housing has a discharge opening 17 at the bottom at one end for passing the liquid water that results from the condensation of the steam inside the condenser housing. The condenser housing 14 has a vent opening 14a near its discharge outlet 17.

The condenser also includes a spiral tube 18 extending along its length inside the housing 14. This tube has an inlet 19 at one end for receiving the "raw" water that is to be distilled, and an outlet 20 at the opposite end.

A constant level device 21 is connected between the condenser tube outlet 20 and the bottom of the boiling chamber in receptacle 10. This constant level device includes an upstanding auxiliary receptacle 22 having an inlet neck 23 that is connected to the condenser tube outlet 20 through a flexible hose 24. Spaced below its inlet 23, the auxiliary receptacle 22 has a neck 25 that defines an opening which is connected through a flexible hose 26 to an opening 27 at the bottom of the boiling chamber receptacle 10. The opening provided by neck 25 is at a level just slightly lower than that of opening 27. The hose 26 provides free fluid communication between the two receptacles 22 and 10, so that the static water level in the boiling chamber will be the same as the water level in the auxiliary receptacle 22.

The constant level device 21 has an overflow tube 28 extending up inside the auxiliary receptacle 22 and having an outwardly-flared, upwardly-facing, open upper end 28a. This overflow tube 28 is open at the bottom wall 22a of the auxiliary receptacle 22. A discharge pipe 29 extends downward and laterally outward from the bottom wall 22a of the auxiliary receptacle 22 for passing water from the overflow tube 28.

In accordance with the preferred embodiment of this invention, the overflow tube 28 is formed with a drain opening 30 (FIG. 2) in its vertical side wall facing toward the outlet at 25 and just above the bottom wall 22a of the auxiliary receptacle. This drain opening 30 is at a level just slightly lower than the bottom of the boiling chamber in receptacle 10.

The complete apparatus also has suitable controls (not shown) for stopping the inlet flow of water to the inlet 19 when the heater 12 is turned off, as well as various other conventional controls for automatic operation of the apparatus.

OPERATION

In the operation of this apparatus, the water that is to be distilled first flows through the spiral tube 18 inside the condenser and then down to the inlet 23 of the constant level device 21. The water then flows out through the hose 26 to the bottom of the boiling chamber in the receptacle 10. A small amount of water drains continuously through the drain opening 30 in the overflow tube 28 in the constant level device. The static water level in the boiling chamber stabilizes at the level of the top opening 28a in the overflow tube 28.

When the heater 12 is energized and water boils in the boiling chamber, the steam thus produced passes through the vapor outlet 13 and through tube 16 into the condenser housing 14, where it is condensed to the liquid state again. The water in the tube 18 inside the condenser housing produces a cooling effect which contributes to the steam condensation action that takes place in the condenser. The distillate flows out of the condenser discharge opening 17 to a suitable storage receptacle (not shown).

When a desired quantity of distilled water has been produced, the heater 12 is de-energized automatically. Each time this happens the boiling chamber in receptacle 10 is drained completely through the drain opening 30, as is the auxiliary receptacle 22, also. This draining of the boiling chamber after each use is extremely important from a practical standpoint because it prevents the buildup of water-borne sediment that otherwise would remain in the boiling chamber after boiling stops. In practice, such sediment can become mud-like in consistency and can produce an undersirable foaming action when the water is boiled. With the present drain arrangement the need to disassemble the apparatus for removal of such deposits from the boiling chamber is minimized. This is important for a product intended for use in the home where trouble-free, maintenance-free operation is the desired ideal. The outwardly-flared shape (at 28a) of the upper end of the overflow tube enables the flow down through this tube to be relatively free and independent of pressure variations, as contrasted with a uniform diameter overflow tube which was found to restrict the flow under certain circumstances.

I claim:

1. In a water distillation apparatus having
 a receptacle providing a boiling chamber, heating means for boiling the water in said receptacle;
 a condenser connected to receive water vapor from said boiling chamber;
 and a constant level device including an auxiliary receptacle having a fluid connection to the bottom of said boiling chamber and having a water inlet above said connection, a downwardly extending overflow tube having its upper end open inside said auxiliary receptacle to define the static water level inside said boiling chamber, and means providing a discharge opening from the bottom of said overflow tube;
 the improvement wherein said fluid connection provides a valve-less passageway between the bottom of said boiling chamber and said auxiliary receptacle;
 and further comprising
 means defining a drain opening in said overflow tube of the constant level device which is lower than the bottom of said boiling chamber and communicates directly and uninterruptedly with the bottom of the boiling chamber through said fluid connection to drain the boiling chamber each time the boiling stops and the flow of water into the boiling chamber is discontinued.

2. Apparatus according to claim 1 wherein said overflow tube extends downward inside said auxiliary receptacle, and said drain opening is formed in said overflow tube at the bottom of said auxiliary receptacle.

3. Apparatus according to claim 2, wherein said condenser has an outer housing, and a spiral tube inside said housing with a water inlet at one end and a water outlet at the opposite end which is connected to said water inlet of the constant level device to supply water thereto, said housing having a water vapor inlet connected to said boiling chamber and located outside said spiral tube, and said housing having a distilled water outlet located outside said spiral tube.

4. Apparatus according to claim 2, wherein said condenser has a spiral tube inside with a water inlet at one end and a water outlet at the opposite end which is connected to said water inlet of the constant level device to supply water thereto.

5. Apparatus according to claim 1, wherein said overflow tube has an outwardly-flared, upwardly-facing, open upper end.

6. Apparatus according to claim 1, wherein said condenser has a spiral tube inside with a water inlet at one end and a water outlet at the opposite end which is connected to said water inlet of the constant level device to supply water thereto.

* * * * *